(No Model.)

C. M. BLYDENBURGH.
VEHICLE.

No. 395,870. Patented Jan. 8, 1889.

WITNESSES
J. W. Fowler
W. H. Patterson

INVENTOR
Chas M. Blydenburgh.
by A. H. Evans & Co
his Attorneys

UNITED STATES PATENT OFFICE.

CHARLES M. BLYDENBURGH, OF RIVERHEAD, NEW YORK.

VEHICLE.

SPECIFICATION forming part of Letters Patent No. 395,870, dated January 8, 1889.

Application filed October 12, 1888. Serial No. 287,905. (No model.)

*To all whom it may concern:*

Be it known that I, CHARLES M. BLYDENBURGH, a citizen of the United States, residing at Riverhead, Long Island, State of New York, have invented certain Improvements in Vehicles, of which the following is a full and clear description, reference being had to the accompanying drawings, forming part of this specification, in which—

Figure 1:
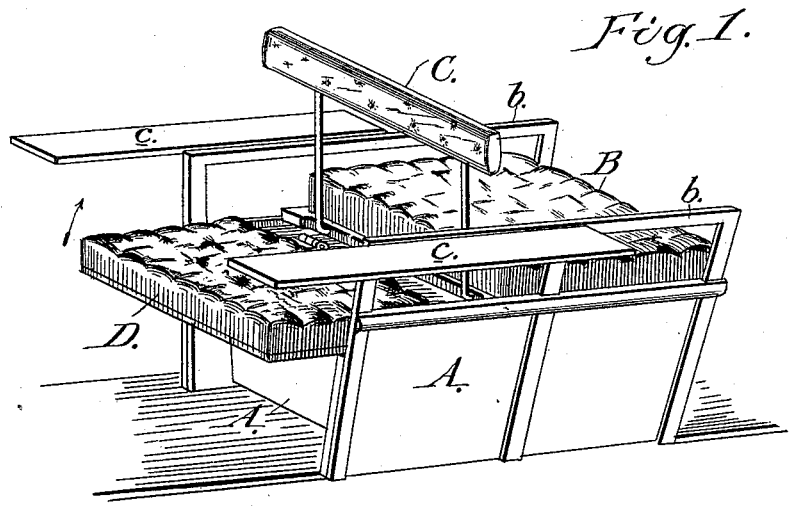
Figure 2:
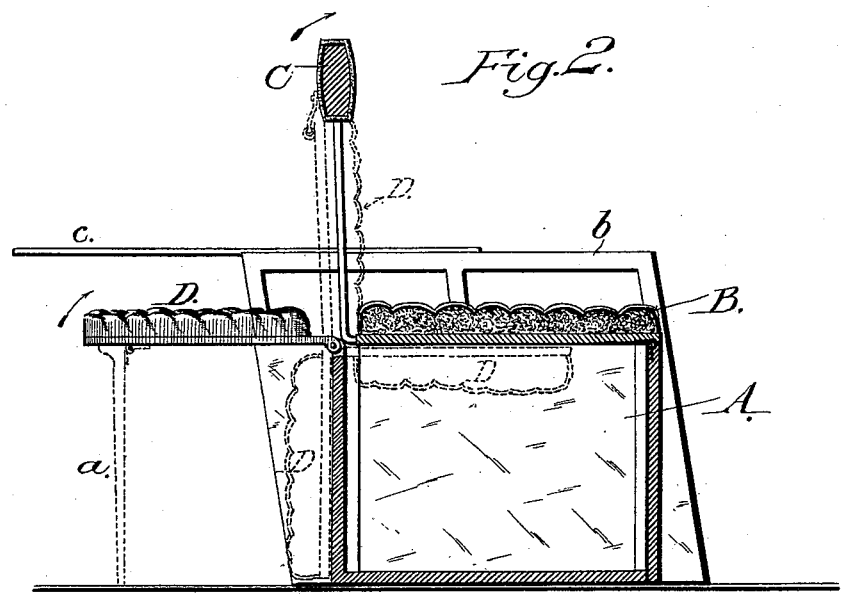

Figure 1 represents a perspective view of a vehicle-body having my improvements applied. Fig. 2 is a sectional view of the same.

My invention relates particularly to the construction of vehicle-seats and their adjuncts; and it consists in the constructions and combinations of devices which I shall hereinafter fully describe and claim.

To enable others skilled in the art to which my invention appertains to make and use the same, I will now describe its construction and indicate the manner in which the same is carried out.

In the said drawings, A represents the vehicle-body, of any approved design and construction, and having, preferably, an internal chamber, within which may be placed blankets, robes, or other articles. The body A has secured to it the front seat, B, which carries at its rear a rigid lazy-back, C, of any well-known form, and to which a rear seat may be attached when said rear seat is not in use as a seat.

In the construction of "buckboards" and similar vehicles it is desirable that the body should be provided with a supplemental seat which may be readily brought into play for use as a rear seat, and it is also desirable that this seat should fold within the chambered body when not in use, in which case it is out of the way, and yet may readily be converted into a rear seat when the exigencies of the case require its employment.

To provide a simple means of accomplishing the desired results, I hinge in rear of the front seat, either to the rear of said front seat itself or to the rear portion of the body, a seat, D, which may be suitably upholstered, and when used in connection with any well-known form of standard or seat-support—such, for instance, as shown at *a*—is particularly applicable as a convenient, strong, and readily-applied rear seat. It is obvious that when this rear seat is used it may be hinged by a universal joint either to the body or front seat, so that it may be turned up against the lazy-back of the front seat, to which it may be secured by hooks or other fastening means, thereby forming a full back; or it may pass behind or under the top rail of the lazy-back when a skeleton lazy-back is employed, as shown in Fig. 1, and when not in use it may be readily folded into the body of the vehicle by simply swinging the front seat on its hinge, if a hinged seat is used, until the chamber beneath is exposed to permit the introduction of the rear seat. By this construction I am enabled to provide a vehicle with a readily-convertible rear seat of simple construction, which serves the double purpose of a rear seat and also a means of converting a skeleton lazy-back into a "full back."

Instead of the rear seat folding into the body or box, it may fold down back of said body, in which case the front seat need not necessarily be hinged, but may be a rigid seat, and the said rear seat may also be used with said rigid seat, and may fold up against the lazy-back and be secured thereto, in which case it is out of the way and not liable to the injurious effects of the weather.

Another feature of my invention is the providing of means whereby the occupant of the rear seat is furnished with an arm-support when the rear seat is in use, for it is evident that when a seat extends back of the front seat and the occupant is compelled to ride backward some means should be provided to serve as a support or rest for the arms of the rear occupant, and also prevent his being unseated by the sudden lurching of the vehicle. To provide this important factor, I secure to the side rails, *b*, of the body suitable supports, *c*, which are sufficiently wide to form a secure rest for the arms, and said supports project rearwardly beyond the body or box A of the vehicle to insure the safety of the occupant even though the vehicle should be given a sudden lurch. When this rear seat and the arm-supports are employed, it will be understood that the bottom or floor of the vehicle will project far enough back of the box or body A to furnish room for the occupant's feet.

I am aware that mud-fenders have been employed on different classes of vehicles, and I do not claim that my supports c serve the purpose of said fenders; in fact they do not and cannot be made to take their place, because they are secured near the side rails of the body, and do not project far enough to come over the wheels to catch the flying mud, while with mud-fenders they are directly over the wheels, and are usually supported from the body by rods or braces, and leaving large spaces between the said fenders and the side of the body.

Having thus described my invention, what I claim as new, and desire to secure by Letters Patent, is—

1. The combination, with a vehicle-body having an internal chamber and a seat hinged to the front thereof and provided with a lazy-back, of a supplemental seat hinged in the rear of said front seat and adapted to serve as a rear seat, said rear seat being also adapted to fold up against and be secured to the said lazy-back, substantially as and for the purpose described.

2. The combination, with a vehicle-body having a folding seat, of suitable arm-supports secured to said body and projecting behind the body of the vehicle, substantially as and for the purpose herein described.

3. The combination, with a vehicle-body having a hinged front seat, of a rear seat adapted to fold within the body, and suitable supports, c, for the arms, said supports being secured to the sides of the body and projecting rearwardly beyond said body, whereby they serve as a protection to the occupant of the rear seat, substantially as described.

4. An improved vehicle comprising a chambered body portion, a front seat hinged thereto and provided with a lazy-back, a supplemental seat hinged in rear of the front seat and adapted to fold within said body and up against said lazy-back, and suitable arm-supports secured directly to the body and projecting in rear thereof, substantially as and for the purpose described.

CHARLES M. BLYDENBURGH.

Witnesses:
W. H. PATTERSON,
EDWARD FOWLER.